US006971505B2

(12) United States Patent
Gutekunst

(10) Patent No.: US 6,971,505 B2
(45) Date of Patent: Dec. 6, 2005

(54) TRANSPORTING ROLLER, HOLDING-DOWN MEANS AND TRANSPORTING SYSTEM FOR FLAT ARTICLES

(75) Inventor: Jürgen Gutekunst, Furtwangen (DE)

(73) Assignee: RENA Sondermaschinen GmbH, Gütenbach (DE)

(*) Notice: Subject to any disclaimer, the term of this patent is extended or adjusted under 35 U.S.C. 154(b) by 0 days.

(21) Appl. No.: 10/413,138

(22) Filed: Apr. 15, 2003

(65) Prior Publication Data

US 2003/0194309 A1 Oct. 16, 2003

(30) Foreign Application Priority Data

Apr. 15, 2002 (EP) .................................. 02008526

(51) Int. Cl.[7] ............................................ B65G 13/07
(52) U.S. Cl. .................................... 198/790; 198/781.1
(58) Field of Search ............................ 198/781.1, 790, 198/608, 611

(56) References Cited

U.S. PATENT DOCUMENTS 2,979,829 A 4/1961 Uhleen
4,248,341 A * 2/1981 Schuck et al. ............. 198/790

(Continued)

FOREIGN PATENT DOCUMENTS

DE 328867 11/1920
DE 1 256 963 12/1967
DE 30 35 117 4/1981
DE 31 40 546 A1 5/1983
DE 3711697 * 2/1988 ................ 198/790
EP 1 032 023 A2 2/2000

(Continued)

OTHER PUBLICATIONS

English Abstract for Japanese Document JP 63-097513, Patent Abstracts of Japan, Japan Patent Office, 1998.

(Continued)

*Primary Examiner*—James R. Bidwell
(74) *Attorney, Agent, or Firm*—Griffin & Szipl, P.C.

(57) ABSTRACT

The invention relates to transporting rollers (22) for transporting essentially flat articles, to holding-down means (23) for pressing the articles onto transporting rollers (22), and to a transporting system (30). In this case, the transporting roller (22) is of at least two-part configuration and comprises a spindle element and at least one track element (1), the latter enclosing the spindle element in a tubular manner.

The invention consists in designing transporting rollers (22) such that the spindle element is flexurally rigid, and in presenting an essentially cylindrical holding-down means (23) which is of at least two-part configuration and comprises a spindle (8) and at least one sleeve (13), wherein the internal diameter of the sleeve is larger than the external diameter of the spindle, the spindle (8) and the sleeve (13) of the holding-down means are coupled, and a pin-like carry-along element which is oriented away from the spindle (8) and engages in a cutout (16) on at least one side of the sleeve (13) is fitted on the spindle (8).

The invention allows articles to be processed continuously, while keeping to the correct track as precisely as possible, with careful handling, in the case of which, under a wide range of different conditions in respect of temperature, pressure and surrounding medium, the workpieces are exposed to only a low level of mechanical loading.

41 Claims, 9 Drawing Sheets

U.S. PATENT DOCUMENTS

| | | | | |
|---|---|---|---|---|
| 4,495,683 | A | 1/1985 | Delhaes | |
| 4,753,339 | A * | 6/1988 | Vogt et al. | 198/781.03 |
| 5,040,669 | A * | 8/1991 | Blocker | 198/782 |
| 5,209,342 | A * | 5/1993 | vom Stein | 198/790 |
| 5,711,806 | A | 1/1998 | Harnden | |
| 6,003,661 | A | 12/1999 | Beck | |
| 6,161,681 | A * | 12/2000 | Kalm | 198/790 |
| 6,494,306 | B1 * | 12/2002 | Hollander | 198/790 |

FOREIGN PATENT DOCUMENTS

| | | | |
|---|---|---|---|
| JP | 63-97513 | * 4/1988 | 198/790 |

OTHER PUBLICATIONS

Webster's new collegiate dictionary, p. 374, 1977.

European Search Report completed Dec. 5, 2002 and mailed Dec. 13, 2002.

* cited by examiner

TRANSPORTING ROLLER, HOLDING-DOWN MEANS AND TRANSPORTING SYSTEM FOR FLAT ARTICLES

The invention relates to transporting rollers for transporting essentially flat articles, to holding-down means for pressing essentially flat articles onto transporting rollers, and to a transporting system for transporting essentially flat articles.

PRIOR ART

In a production chain, it is often necessary for the articles which are to be transported to be guided past a number of production stations. In this case, a certain distance is covered at a certain speed, the articles passing through different temperatures, pressures and media. For this purpose, up until now, flat articles have been positioned on a workpiece carrier or conveyed by a chain or pushing-action drive. Such apparatuses are presented, for example in EP 001 032 023 A1. Moreover, DE 30 35 117 A1 discloses a roller for a roller conveyor.

DE 328 867 C presents a transporting roller with track keepers. U.S. Pat. Nos. 2,979,829 A and 6,003,661 A. disclose transporting rollers which are constructed in two parts from a spindle and a track element, it being possible for the track width of the transporting roller described in U.S. Pat. No. 2,979,829 to vary.

DE 12 56 963 B and DE 31 40 546 A present holding-down means which are configured in two parts from a spindle and a sleeve, the internal diameter of the sleeve being larger than the external diameter of the spindle and an elastic coupling being provided between the spindle and sleeve.

Furthermore, U.S. Pat. No. 5,711,806 A discloses a transporting system which is intended for transporting flat articles through chemical baths, is provided with transporting rollers and holding-down means and in the case of which the holding-down means are mounted in a resilient manner.

DISADVANTAGES OF THE PRIOR ART

Transportation using workpiece carriers does indeed provide very stable mounting for the individual articles and, depending on the configuration, also good contact between the transportable articles and the surrounding medium, with which, in some circumstances, a wet chemical process proceeds.

However, the operation of charging the workpiece carriers involves very high outlay and, in mass production, results in a considerable amount of time being lost and thus in an undesirable cost factor.

It is easier to charge a transporting system in the case of a chain, pushing-action or roller drive. In this case, the transportable articles are usually just placed in position and, depending on the application, appropriately fixed.

In the case of transportation using the assembly-line principle, it has to be ensured at the individual processing stations that the workpiece is accessible for processing, chemical reactions, spraying, etc. For this purpose, it has to be rearranged in some cases, which renders the process laborious.

A particular problem is the high rate of breakage in the case of sensitive articles such as thin semiconductor wafers or blanks for solar-cell production. Since the individual articles are positioned loosely and/or in a freely moveable manner, they can easily move out of the predetermined track, or lose their orientation, as a result of vibrations of the transporting system. If the articles are no longer located in the predetermined manner on the transporting belt, it is difficult for the articles to be taken up for a further processing step or rearrangement and, in some cases, this thus cannot take place mechanically. If the articles collide or even if they just move into an undefined position, then the quality of the rest of the processing may be impaired because the articles are no longer intercepted in full or at the correct location. In the event of collision with a fixed component, moreover, there is the risk of breakage.

A further problem arises if the articles are to be guided into a liquid medium. If the articles are not fixed, they may become detached from the transporting system as a result of buoyancy. This problem is increased further if a wet chemical reaction takes place. This may result in the formation of bubbles and associated buoyancy.

It is possible to counteract the buoyancy of the articles in liquids by using a holding-down means. The latter presses the articles onto the transporting system located therebeneath. In this case, however, the articles are subjected to the pressure of the holding-down means, which, in particular during introduction into a wet chemical basin and in the case of fluctuations in thickness of the articles, gives rise to the risk of breakage.

Moreover, all the transporting systems have shortcomings as far as the use of chemical or temperature-dependent processes is concerned. The transporting medium, be this a chain, roller or workpiece carrier, should only expand to an insignificant extent in the event of an increase in temperature, in order to ensure the uniformity and the rectilinearity of the workpiece transportation; at the same time, the transporting medium has to be produced from a material which, during wet chemical processing, is not itself attacked or does not react as well.

A possible solution to this problem is presented in DE 30 35 117 A, in which a two-part roller is described. The spindle, consisting of a very temperature-resistant material, such as glass fiber or carbon fiber, is enclosed by an elastic, chemically resistant coating. In the event of temperature fluctuations, however, this coating will experience at least relatively small changes in extent, which, in turn, impairs the stability of the position and orientation of the articles.

OBJECT OF THE INVENTION

The object of the invention is to propose transporting rollers, holding-down means and a transporting system which allow essentially flat workpieces to be processed continuously, while keeping to the correct track as precisely as possible, with careful handling and which, under a wide range of different conditions in respect of temperature, pressure and surrounding medium, expose the workpieces to only a low level of mechanical loading.

ACHIEVING THE OBJECT

The object is achieved by designing transporting rollers with at least one track element such that the track element has at least one track keeper, which has a diameter which is larger than the diameter of the track element in the region outside the track keeper, and the transporting roller is of at least two-part configuration and comprises a spindle element and at least one track element, the latter enclosing the spindle element in a tubular manner, and the spindle element being flexurally rigid.

The object is further achieved in that an essentially cylindrical holding-down means is of at least two-part configuration and comprises a spindle and at least one sleeve, wherein the internal diameter of the sleeve is larger than the external diameter of the spindle, the spindle and the sleeve of the holding-down means are coupled, and a pin-like carry-along element which is oriented away from the spindle and engages in a cutout on at least one side of the sleeve is fitted on the spindle.

Particularly advantageous solutions involve the design of transporting systems for transporting essentially flat articles, having transporting rollers and holding-down means according to the invention.

ADVANTAGES OF THE INVENTION

The essential advantage of the invention is that the transporting rollers, under different conditions, guarantee stable transportation of the workpiece.

In order for the articles to run uniformly, it is important for the track elements to have track keepers. As a result of the vibration of the drive, the changeover of the surrounding medium and other factors, the workpiece may move out of its initial position and orientation. This involves the risk of materials being adversely affected. Moreover, as precise positioning as possible is necessary for further mechanical processing and automatic take-up of the workpiece.

As a result of its relatively large diameter, the track keeper causes a workpiece which slides against it to return to its starting position again. Since the track keeper, rather than being a fixed component, is connected to the rotating track elements and since, moreover, the diameter of the track keeper is larger than that of the track element in the region in which the articles should be positioned, the speed of the track keeper is greater than the speed of the track element in the envisaged bearing region. In the event of articles and a track element colliding, the risk of breakage is thus drastically reduced.

The track keeper either is designed as part of the track-element profile or is produced from a suitable material and positioned on the track element. It is preferably conical in side view.

The transporting roller is preferably of at least two-part construction and comprises a spindle element 50 and at least one track element 1 enclosing the spindle element 50. The spindle element may perform either a stabilizing or a mounting function. The spindle element is preferably a bearing spindle. The material of the spindle element, which does not come into contact either with the articles or with a, in some cases, aggressive chemical environment, may be selected purely from mechanical and thermal points of view. According to the invention, the spindle element is flexurally rigid. The track element, in contrast, on account of the stabilizing bearing spindle, is allowed certain thermal tolerances. It is critical for the material not to react either with the articles or with the surrounding medium. The flexurally rigid bearing spindle 50 ensures that the articles are kept in a firmly defined straight line in the direction perpendicular to the transporting direction. This results in the transporting roller running uniformly along its entire length, which is important in particular in the case of relatively wide transporting rollers with a plurality of transporting tracks and for flat articles which are susceptible to breakage.

In a preferred configuration, the spindle element is produced from a carbon fiber composite. Carbon fiber composites have a high thermal and mechanical stability and thus lend themselves particularly well for use as a bearing spindle exposed to fluctuating temperatures.

In a preferred embodiment, the bearing spindle is encapsulated, for example by means of sealing rings, in relation to the medium through which the articles are guided. The medium, which may be a wet chemical bath or a wet chemical spray, then merely comes into contact with the exterior of the track elements and the fluid medium cannot reach the interior of the track elements, the bearing spindle or any fixing elements which may be provided between the bearing spindle and track elements. The seals may be of liquid-tight or even, to a certain degree, gas-tight configuration, with the result that harmful vapors cannot reach the interior of the track elements either.

The track elements can be joined together to form any desired length; a transporting roller may comprise, for example, a spindle with any desired number of track elements. A manufacturer or vendor of transporting rollers can be very flexible in meeting a customer's requirements without any complicated stockkeeping being necessary. Since it can be used for transporting rollers of any length, the track element is a mass-produced article, which lowers the production price.

It may be possible for the track elements, for example, to be plugged together, screwed to one another, connected by a clip or welded to one another.

In an advantageous embodiment, it is possible for a track keeper to be made up of at least two disk elements which can be positioned symmetrically in relation to one another and can be fitted on a track element.

The two disk elements together preferably give an essentially conical track keeper, that is to say the two elements, in one embodiment, have a conical flattened portion on one side. The at least two-part configuration of the track keeper is particularly advantageous when the component is produced by injection molding. It is possible for the disk elements to be pushed onto the track element and fixed at a selectable position.

It is also possible for more than two disk elements to be joined together to form a track keeper, which is then of a more complex shape. This configuration is expedient if, as will be described at a later stage in the text, adjacent transporting rollers are arranged in close proximity to one another and the track keepers of the adjacent transporting rollers are to engage one inside the other.

The workpiece actually bears, in a preferred embodiment, on bearing elements with static-friction properties appropriate for the workpiece. These elements should likewise be thermally and chemically stable. The use of O-rings made of fluororubber has proven successful for the production of solar cells. Since the diameter defined by the bearing elements is larger than the rest of the track elements, with the exception of the track keeper itself, the articles are only exposed to punctiform contact. In contrast to linear contact, this assists in the careful handling of the articles and, at the same time, provides for good contact with the surrounding medium.

In a further advantageous configuration, the track element is produced from plastic. Plastic, as is known, is easy to process and provides a wide range of different properties which are selected in dependence on the (location of) use of the transporting roller. For example, it has proven successful to use polyethylene, polyfluoroalkoxide or polyvenylidene fluoride. These materials are temperature-resistant to above 80 degrees Celsius, can be welded, have a certain chemical resistance, do not give rise to metal contamination and exhibit only a low degree of wear.

An advantageous development of the invention consists in that track elements can be driven. Transporting rollers with such track elements can be joined together to form transporting systems which run particularly uniformly. Optimum traction is transmitted to the articles.

In a preferred embodiment, a first peripheral element of a joined-together row of track elements has means for transmitting the drive power and a second peripheral track element has rotatable-mounting means. The drive power can be transmitted to the transporting roller via a coupling element which is fitted to a drive shaft and can be connected to the first peripheral track element. The coupling element, moreover, has a means for accommodating the bearing spindle. If a transporting roller is to be removed from a transporting position, then first of all the second peripheral track element is to be released from the mounting, the entire transporting roller is to be pivoted about the coupling element, and then the transporting roller is to be removed from the coupling element.

The rotatable-mounting means may comprise a top and a bottom half-shell, of which the bottom half-shell is fixed on the wall of the transporting system and serves for bearing the transporting roller and the second, top half-shell is fastened in a releasable manner for arresting purposes.

The width of the track element advantageously corresponds at least to the width of the workpiece which is to be transported, with the result that, widthwise, a workpiece is only located on one track element. It is preferable for each track element to accommodate just one workpiece, that is to say the width of the track element and articles are more or less equal.

In an advantageous configuration of the transporting roller, a fixing ring is fitted on the bearing spindle, the internal diameter of a track element, at least at one location, being smaller than the diameter of the fixing ring. The fixing ring thus prevents a track element from being capable of executing relatively large movements on the bearing spindle. This is important in particular in the event of changes in temperature if the materials of the bearing spindle and track elements expand to different extents and movements relative to one another could be caused as a result.

The fixing ring is preferably produced from metal, since it is possible for metal to be bent well onto the spindle and clamped firmly there.

For use at different temperatures, small changes in length should not adversely affect the stability of the transporting roller as a whole and it is thus the case that, in a further advantageous configuration of the invention, the track elements are provided with a compensation fold for compensating for thermal expansions. The compensation fold usually comprises an internally hollow convexity in the material of the track element which allows for the temperature-induced material expansion by way of straightening out in the longitudinal direction. If the compensation fold is not located between the bearing points of the articles, then the bearing stability remains stable even in the event of temperature-induced changes in length.

If, moreover, the track elements are fixed on the bearing spindle in each case, the rectilinearity of the track is also maintained.

In an advantageous embodiment of the invention, track keepers of adjacent transporting rollers move, without contact, one in front of the other, one beside the other or one inside the other. During transportation, the articles move from transporting roller to transporting roller. For stable mounting, the transporting rollers should be as close together as possible, in order that large parts of the workpiece are not hanging without support in the transporting direction. On the other hand, as a result of the diameter of the track keepers, a certain minimum spacing is necessary in the case of a contact-free sequence of transporting rollers. This minimum spacing may be reduced if the track elements of successive transporting rollers are offset to some extent in relation to one another, with the result that the track keepers can rotate one beside the other without coming into contact. In the case of a further configuration, it is provided that adjacent transporting rollers are of different types, with the result that one type of track keeper has a recess in which the other type is positioned (male and female types). In this case, the transporting rollers are arranged with the track keepers in an alternating sequence.

Using a series of transporting rollers according to the invention makes it possible to change the track, for example the track may be tapered by track keepers being spaced apart to an increasingly lesser extent.

During the transportation of flat articles through liquid substances or through sections in which the articles are sprayed with a gas or a liquid, it is advantageous to use holding-down means in order to protect the articles against buoyancy. The holding-down means, according to the invention, is of at least two-part design. It comprises a spindle and sleeve with an internal diameter which is larger than the external diameter of the spindle. The sleeve thus has an amount of play in relation to the spindle; it hangs on the mounted spindle and the central axes of the sleeve and spindle are not located on a single line. A holding-down means may thus be fitted above a transporting section such that the sleeve of the holding-down means only presses against the articles by way of its own weight. In the event of fluctuations in thickness of the articles, within the context of the play between the sleeve and spindle, it is possible for the sleeve to yield. The play between the sleeve and spindle results in a constant pressure acting on the articles. If this play were not present, the articles could be pressed onto the holding-down means from beneath, as a result of which unnecessary loading would occur, and this could possibly result in breakage.

If, however, firmer guidance of the articles is to be realized, then it is possible to reduce the play between the spindle and sleeve by the external diameter of the spindle and the internal diameter of the sleeve being brought closer together, or by a coupling element being introduced between the spindle and sleeve.

The play between the spindle and sleeve is advantageous, in particular, when articles of different thicknesses are to be guided beneath the holding-down means. Rather than the holding-down means having to be specially refitted, it may then be used for all article thicknesses which are permitted by the play between the sleeve and spindle. The variability of the possible workpiece thickness is also advantageous when fluctuations in the thickness occur within a series, that is to say when articles of different thicknesses are guided one after the other or one beside the other beneath the holding-down means.

The elements of the holding-down means, moreover, can be produced independently and in parallel, which is advantageous in production terms.

The invention provides for the spindle and sleeve to be coupled. This means that the sleeve is carried along when the spindle is driven. Rather than being of rigid configuration, so that the play between the sleeve and spindle is maintained, the coupling preferably just restricts the play.

For the coupling, according to the invention, there is fitted on the spindle a pin-like carry-along element which is oriented away from the spindle and engages in a cutout on at least one side of the sleeve. The pin prevents the sleeve from moving downward from the spindle and from being able to rotate freely about the latter. When the spindle is driven, the sleeve is carried along and the driving power is thus also transmitted to the articles.

It may be possible for the pin to be moved in a resilient manner. It may be produced from an elastic material. In a preferred configuration, however, the pin is a flexurally rigid element which is oriented away from the spindle in the radial direction and is rigidly connected thereto.

It is possible for the pin to engage in a form-fitting manner in the cutout of the sleeve and thus to restrict the play between the spindle and sleeve to a pronounced extent. In a preferred embodiment, however, the diameter of the cutout is larger, at least in one direction, than that of the pin.

In an advantageous configuration, the holding-down means have contact elements which are fixed on the outside of the sleeve and define diameters which are larger than the largest diameter of the holding-down means. This results in the smallest possible contact surface area between the holding-down means and workpiece. In the same way as the punctiform bearing on the transporting rollers, this results in careful handling of the articles and, at the same time, in space being left for the contact with the surrounding medium. O-rings made of fluororubber are advantageously utilized as contact elements.

In a further preferred configuration of the invention, the holding-down means, analogously to the track elements, can be joined together to form any desired length. A holding-down unit may comprise, for example, a series of any desired number of holding-down means. A manufacturer or vendor of holding-down means can be very flexible in meeting a customer's requirements without any complicated stockkeeping being necessary. Since it can be used for holding-down units of any length, a holding-down means is a mass-produced article, which lowers the production price.

It may be possible for the holding-down means, for example, to be plugged together, screwed to one another, connected by a clip or welded to one another. This results in advantages in respect of production and storage.

In an advantageous development, the holding-down means can be driven, which is conducive to the articles running uniformly.

In a preferred configuration, the cutout in the sleeve is designed as a slot with the longitudinal extent running in the circumferential direction. The degree of rotary freedom of the sleeve is thus greater than the ability of the latter to be displaced in the axial direction. Displacement in the axial direction involves the risk of varying the track for the articles. The cutout presented here, on the one hand, allows the abovedescribed play between the sleeve and spindle and, on the other hand, prevents the sleeve from being displaced in the axial direction. The extent of the slot in the longitudinal direction should preferably at least be sufficient for the sleeve, during rotation of the holding-down means, to rest on the spindle in each position.

The uniform guidance of the articles is ensured to particularly good effect if transporting rollers according to the invention are joined together to form a transporting system. This allows the track to be changed by a corresponding arrangement of track keepers.

In a preferred development of the transporting system, each transporting roller is driven. In this case, each transporting roller undergoes the same force transmission and is thus also subjected to the same loading.

Even in the case of the surrounding medium being changed over a number of times, the track keepers keep moving the articles into the correct orientation. The articles may thus continue to be processed mechanically without a manual step being required in the interim.

The careful treatment of the articles is ensured if a transporting system is constructed with holding-down means according to the invention.

A particularly advantageous development of a transporting system consists in guiding the articles between transporting rollers and holding-down means according to the invention. This combination is advantageous, in particular, when the articles are guided through different media, when they are guided past sprays, nozzles, louvers or other processing units, when they are to be dipped, for example, into a basin for wet chemical processing and when the weight of the articles is not sufficient to counteract the ambient force.

In order to be lowered into a basin, the workpiece has to be lowered into the basin via a sloping transporting-roller guide. The holding-down means prevents buoyancy-induced lifting of the workpiece. Transporting rollers with bearing elements ensure that the workpiece does not slide on the slope.

It is possible here for each transporting roller to be assigned a holding-down means or else for holding-down means only to be fitted at locations at which they are necessary for transporting and/or holding-down purposes.

Since the transporting guide allows a high throughput through the transporting system according to the invention, and at the same time handles the articles very carefully, it is particularly suitable for transporting very sensitive articles.

The invention thus proposes the use of a transporting system as a production line in the production of solar cells. Such cells usually have a thickness of from 100 to 500 $\mu$m and usually consist of monocrystalline or polycrystalline silicon. Silicon is a brittle material. The cells are thus very susceptible to breakage and place stringent demands on a transporting system. The transporting system according to the invention allows very careful handling of the wafers along with a high throughput.

In addition to the straightforward transportation of cells, the transporting system makes it possible both for the cells to be dipped into a wet chemical treatment bath and for the two sides of the cells to be subjected to the action of liquid or gaseous media. Applications include cleaning and etching processes (e.g. saw damage etching and phosphorus glass etching). The wafers are then rinsed and dried.

Further advantages and configurations of the invention are described in the subclaims and can be gathered from the description and the attached drawings.

All the features explained can be used not just in the combinations specified in each case but also in other combinations, or alone, without departing from the context of the invention.

DRAWINGS

DESCRIPTION OF AN EXEMPLARY EMBODIMENT

Figure 1:
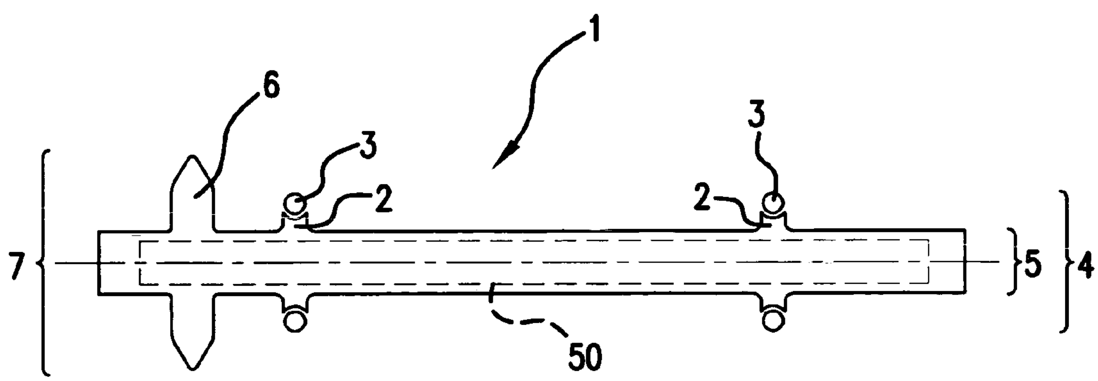
FIG. 1 shows a section through a track element.

In one exemplary embodiment, as is illustrated in FIG. 1, a track element 1 has two grooves 2 which are oriented away from the rotary spindle and on which bearing elements 3, for example O-rings, are located. Since the diameter 4 of the bearing elements 3 is larger than the diameter 5 of the rotary spindle, there is only punctiform contact between the articles (not illustrated in the drawings) and the track element 1. Should a workpiece lose its original position or orientation, then it is pushed back again by a track keeper 6 of the track element 1. The track keeper 6 is oriented away from the rotary spindle and has a diameter 7 which is at a maximum in respect to the track element 1. It is also conical in the view of FIG. 1, the articles sliding off the track keeper upon contact with its conical shape and no tilting taking place on the latter. Thus, as shown in FIG. 1, the track element 1 includes (i) the rotary spindle, (ii) the grooves 2 on which bearing elements 3 are located, and (iii) track keeper 6. In addition, the track element 1 encloses a spindle element 50 in a tubular manner wherein the spindle element 50 is encapsulated, in a fluid-tight manner in relation to a medium through which articles are to be transported.

When the articles are guided in a sloping manner or are dipped into a chemical bath, it is favorable if they are retained by holding-down means 23 (FIGS. 2–6).

Figure 2:
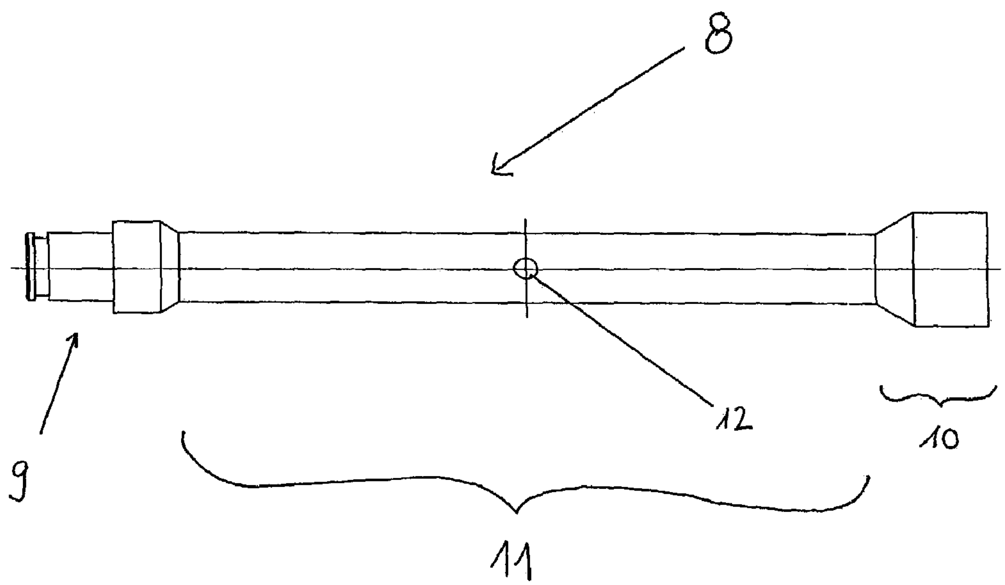
FIG. 2 shows a section through a spindle of a holding-down means.
Figure 3:
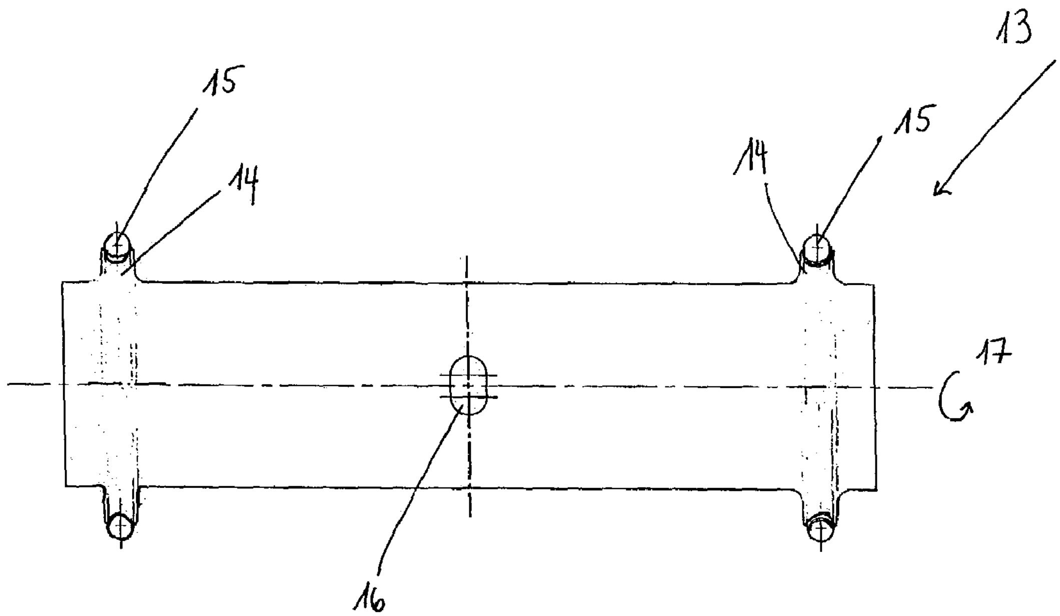
FIG. 3 shows a section through a sleeve of a holding-down means.
Figure 4:
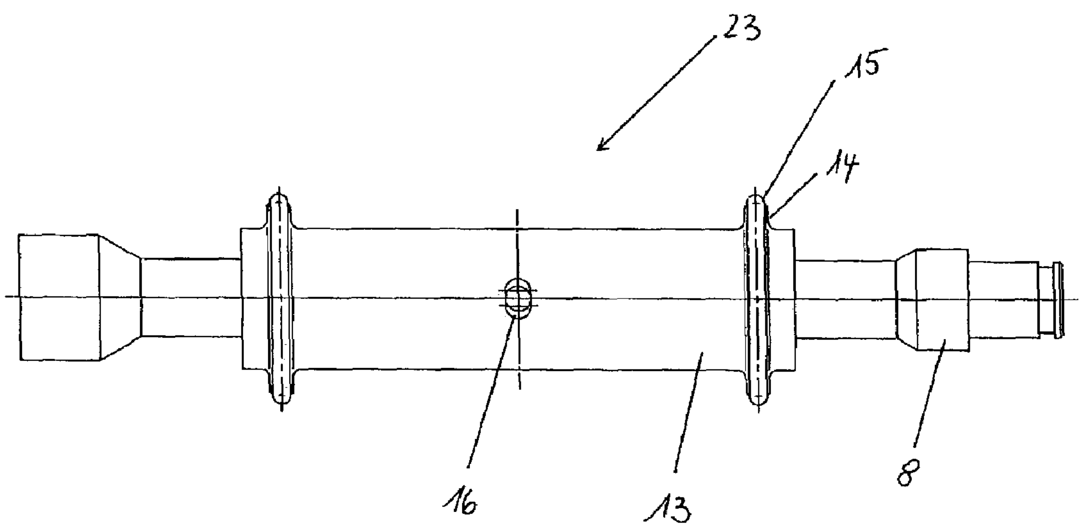
FIG. 4 shows a side view of the holding-down means according to FIGS. 2 and 3.
Figure 5:
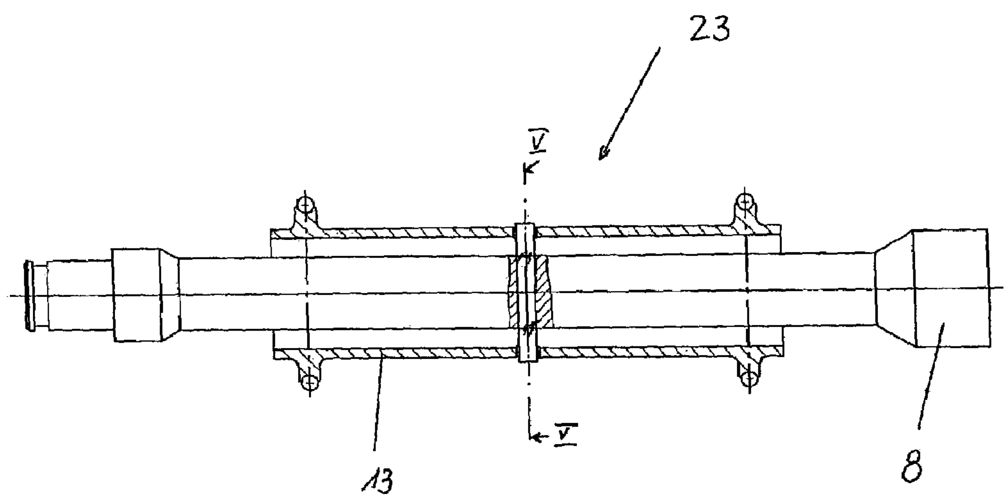
FIG. 5 shows a longitudinal section through the holding-down means according to FIG. 4.

These are preferably of two-part construction. FIG. 2 shows a section through a spindle 8 of part of a holding-down means 23. The spindle 8 is provided with a closure 9, by means of which said spindle can be plugged into a recess 10, located on the opposite side, of a further holding-down spindle (not illustrated specifically) and fastened. The essentially cylindrical spindle 8 has a region 11 of reduced diameter which, in the fitted state, is enclosed by a sleeve 13 (FIG. 3). Located in the center of the region 11 is a bore 12 into which it is possible to introduce a rod-like carry-along element, which serves for coupling the spindle 8 and sleeve.

FIG. 3 shows a sectional view of a sleeve 13. The latter has two grooves 14, which are oriented away from the outside and are intended for bearing contact elements 15, for example O-rings, and a cutout 16 in the form of a slot with the longitudinal direction oriented in the circumferential direction 17.

Figure 6:
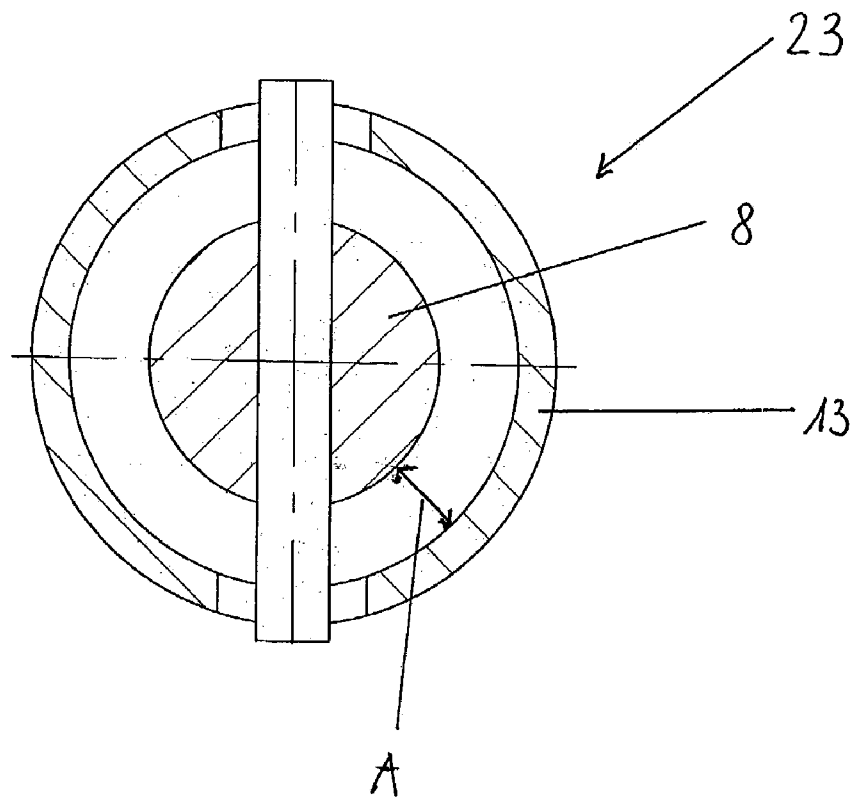
FIG. 6 shows a cross section through the holding-down means according to FIG. 4 along a line V—V in FIG. 5.

FIG. 6 illustrates a sectional illustration through a holding-down means 23 in accordance with the preceding drawings. It can be seen here that a spacing A is provided between the spindle 8 and the sleeve 13. This spacing A corresponds to the workpiece tolerance. This means that it is also possible for relatively thick workpieces to be transported without it being necessary for the transporting system to be readjusted. The spindle 8 thus has an amount of play within the sleeve 13, such that the inner wall of the sleeve 13 can butt against the outer wall of the spindle 8. The rod-like carry-along element here results in the rotation to which the spindle 8 is subjected being transmitted to the sleeve. As a result of the gravitational force and the holding-down means 23 being installed horizontally in the transporting system, the sleeve 13 and the contact element 15 arranged thereon always butt against the workpiece (even during rotation).

Figure 7:
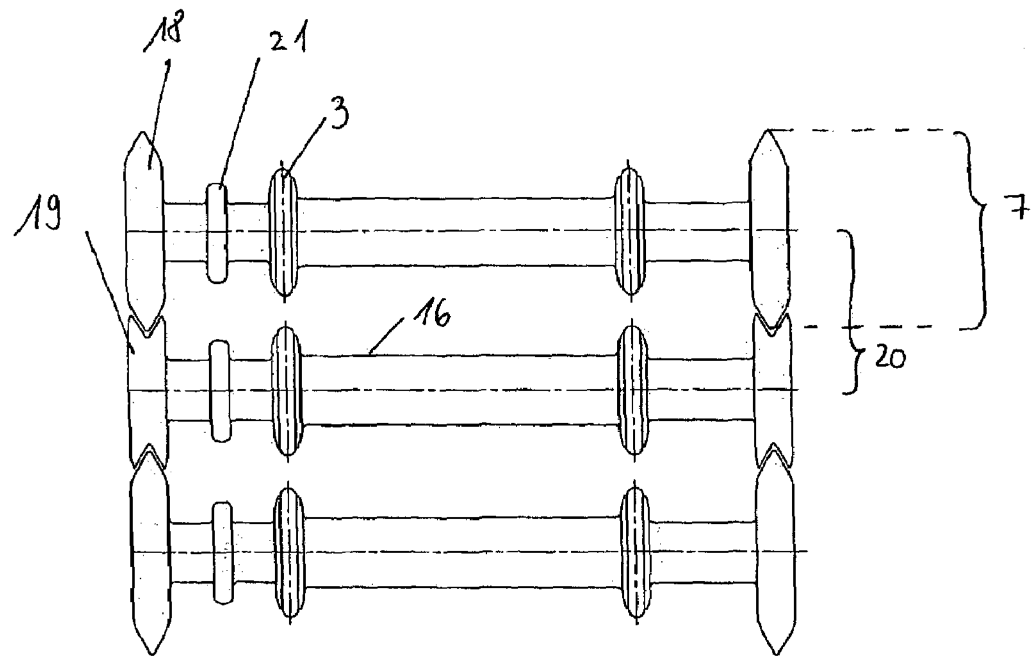
FIG. 7 shows a plan view of adjacent transporting rollers.

FIG. 7 shows the view, in detail form, of a section through two adjacent track elements 1 of different types. Both track elements 1*a*, 1*b* have bearing elements 3. The track keepers, however, are different: a track keeper 18 of so-called male type is oriented away from the spindle of one track element 1*a*, while the adjacent track element 1*b* has a so-called female track keeper 19, which has a recess within which the male track keeper 18 is positioned. It is thus possible for the track elements 1*a*, 1*b* to rotate without contact and for the spacing 20 nevertheless to be smaller than the diameter 7 of the track keepers.

The expansion fold 21 is located between the bearing element 3 and track keeper 18/19. In the event of temperature-induced material expansion, the change in length of the track element 1 is preferably localized to the expansion fold 21. The spacing between the contact elements 3 is maintained and the articles thus continue on the correct track.

Figure 8:
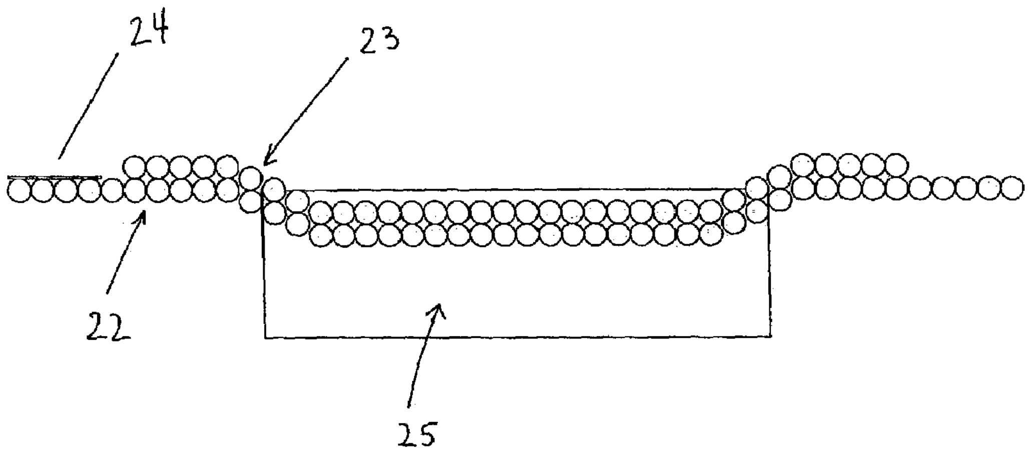
FIG. 8 shows a side view of a transporting system having holding-down means and transporting rollers according to the invention.

FIG. 8 shows a schematic side view of a transporting system having transporting rollers 22 and holding-down means 23. An article 24 rests on transporting rollers 22. As it hangs over into a sloping guide, it is pressed against the transporting rollers 22 by holding-down means 23 and moved in the downward direction. During the operation of dipping into a wet chemical bath 25, the holding-down means 23 prevent buoyancy-induced lifting from the transporting rollers 22.

Figure 9:
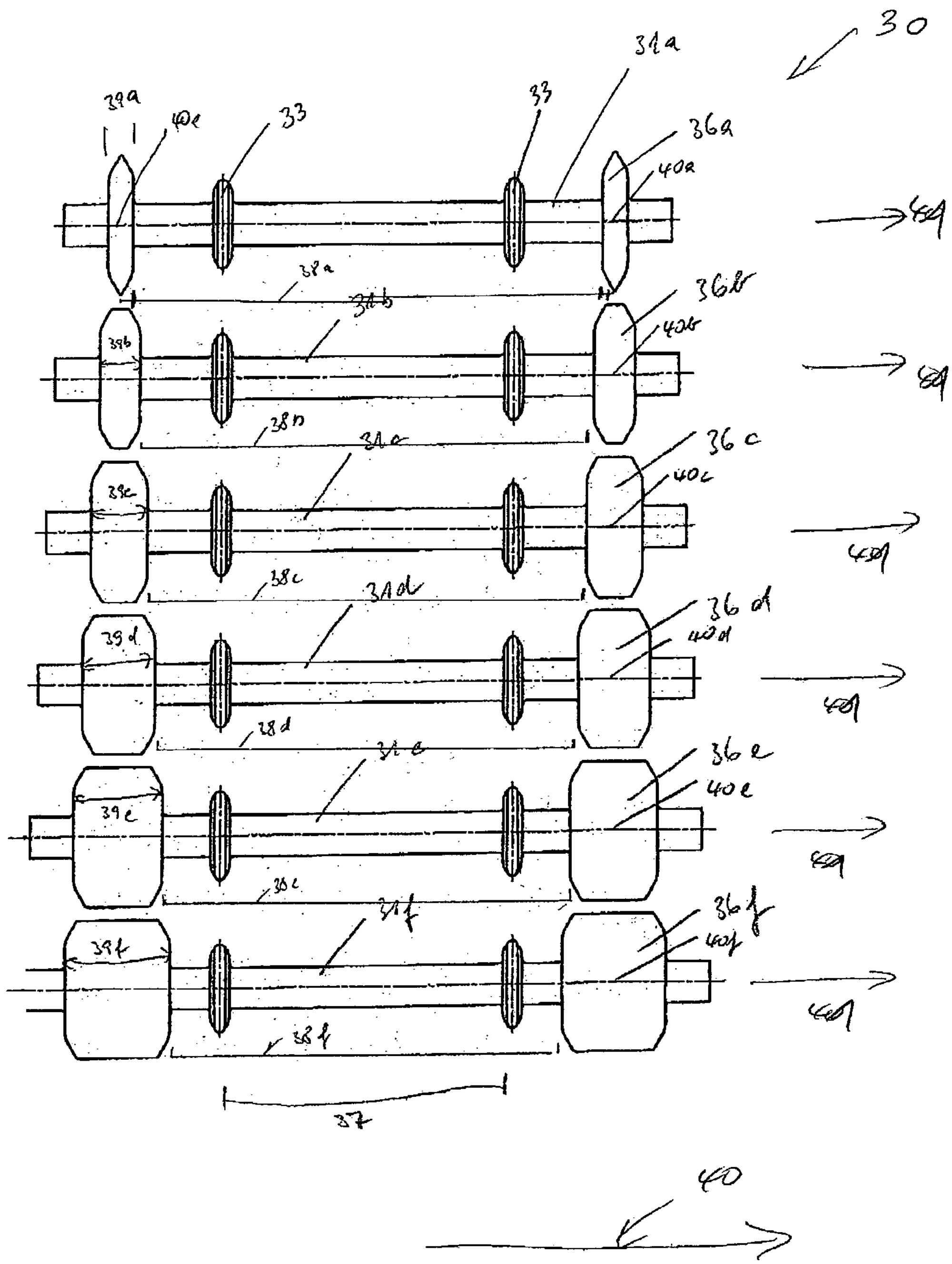
FIG. 9 shows a plan view of an exemplary embodiment for a transporting system with track tapering.

FIG. 9 shows a plan view of an exemplary embodiment for a transporting system 30 with track tapering. The transporting system 30 comprises a series of transporting rollers, of which only individual track elements 31*a*–31*f* are shown in the figure. The track elements 31*a*–31*f* are provided with bearing elements 33 and with track keepers 36*a*–36*f*. While there is a fixed spacing 37 between the bearing elements 33 of adjacent track elements 31*a*–31*f*, there is a reduction in the spacing 38*a*–38*f* between the track keepers 36*a*–36*f*.

In the present exemplary embodiment, the reduction in spacing is achieved in that track keepers 36*a*–36*f* of adjacent track elements 31*a*–31*f* are configured in different thicknesses 39*a*–39*f*; for example, the track keepers 36*c* on the third track element 31*c* have a greater thickness 39*c* than the corresponding track keepers 36*b* on the second track element 31*b*. The centers 40*a*–40*f* of the track keepers 36*a*–36*f*, however, are located in the same position in relation to the longitudinal direction 41 on all track elements 31*a*–31*f*. If one imagines the track elements 31*a*–31*f* to be extended in the longitudinal direction, then a track keeper 36*a*–36*f* is followed by bearing elements 33 again. By virtue of the present arrangement, tracks located one beside the other are tapered at the same time.

In an alternative configuration, it is possible for the spacing between track keepers of the same thickness to be reduced by virtue of the centers of the track keepers of adjacent track elements assuming different positions in relation to the longitudinal direction. In this case, however, two track keepers are necessary for each track, whereas, in the exemplary embodiment shown in FIG. 9, one track keeper 36*a*–36*f* acts on two tracks.

What is claimed is:

1. A transporting roller for transporting essentially flat articles, the transporting roller having an at least two part configuration, comprising:

(a) at least one track element, wherein the track element has at least one track keeper, and wherein the track keeper has a diameter that is larger than a diameter of the track element in a region outside the track keeper; and (b) a flexurally rigid spindle element; wherein the at least one track element, encloses the spindle element in a tubular manner and encapsulates the spindle element in a fluid tight manner.

2. The transporting roller as claimed in claim 1, wherein the spindle element is produced from a carbon fiber composite.

3. The transporting roller as claimed in claim 1, wherein the track element is joinable to a plurality of track elements to form any desired length.

4. The transporting roller as claimed in claim 1, wherein the track keeper is conical.

5. The transporting roller as claimed in claim 1, wherein the track element is produced from plastic.

6. The transporting roller as claimed in claim 1, wherein the track element can be driven.

7. The transporting roller as claimed in claim 1, wherein the width of the track element corresponds at least to the width of articles that are to be transported.

8. A holding-down means for exerting pressure on essentially flat articles, wherein the holding-down means is essentially cylindrical and is of at least a two-part configuration, and comprises a spindle and at least one sleeve, and an internal diameter of the sleeve is greater than an external diameter of the spindle, wherein the spindle and the sleeve of the holding-down means are coupled, and a pin carry-along element, which is oriented away from the spindle and engages in a cutout on at least one side of the sleeve, is fitted on the spindle.

9. The holding-down means as claimed in claim 8, wherein the holding-down means has at least two spaced-apart contact elements fixed on the outside, a diameter defined by the contact elements in each case is larger than a largest diameter of the holding-down means.

10. The holding-down means as claimed in claim 8, wherein holding-down means are joinable to a plurality of holding-down means to form any desired length.

11. The holding-down means as claimed in claim 8, wherein the holding-down means are drivable.

12. The holding-down means as claimed in claim 8, wherein the cutout in the sleeve is configured as a slot with the longitudinal extent running in the circumferential direction.

13. A transporting system for transporting essentially flat articles, having transporting rollers for transporting the essentially flat articles, the transporting rollers each having an at least two part configuration, comprising:

(a) at least one track element, wherein the track element has at least one track keeper, and wherein the track keeper has a diameter that is larger than a diameter of the track element in a region outside the track keeper; and (b) a flexurally rigid spindle element; wherein the at least one track element encloses the spindle element in a tubular manner and encapsulates the spindle element in a fluid tight manner.

14. A transporting system, for transporting flat articles, having transporting rollers and having a holding-down means, further comprising a track element of the transporting rollers having at least one track holder, having a diameter that is larger than a diameter of the track element in a region outside the track keeper, wherein each transporting roller is of at least a two-part configuration and comprises a flexurally rigid spindle element and at least one track element, the track element enclosing the spindle element in a tubular manner, wherein the holding-down means is essentially cylindrical and is of at least a two-part configuration and comprises a spindle and at least one sleeve, wherein an internal diameter of the sleeve is larger than an external diameter of the spindle.

15. A transporting system, for transporting essentially flat articles, having holding-down means for exerting pressure on essentially flat articles, wherein the holding-down means is essentially cylindrical and is of at least a two-part configuration and comprises a spindle and at least one sleeve, wherein an internal diameter of the sleeve is larger than an external diameter of the spindle, and the spindle and the sleeve of the holding-down means are coupled, and a pin carry-along element, which is oriented away from the spindle and engages in a cutout on at least one side of the sleeve, is fitted on the spindle.

16. A transporting system, for transporting flat articles, having transporting rollers with at least one track element and having a holding-down means, wherein the track element has at least one track keeper, which has a diameter that is larger than a diameter of the track element in a region outside of the track keeper, and the holding-down means is essentially cylindrical and is of at least a two-part configuration and comprises a spindle and at least one sleeve, wherein an internal diameter of the sleeve is larger than an external diameter of the spindle, and the spindle and the sleeve of the holding-down means are coupled, and a pin carry-along element, which is oriented away from the spindle and engages in a cutout on at least one side of the sleeve, is fitted on the spindle.

17. The transporting system as claimed in claim 13, wherein each transporting roller is drivable.

18. A method of transporting essentially flat articles comprising the steps of:

providing a transporting system for transporting essentially flat articles, having transporting rollers for transporting the essentially flat articles, the transporting rollers each having an at least two part configuration, comprising:

(a) at least one track element, wherein the track element has at least one track keeper, and wherein the track keeper has a diameter that is larger than a diameter of the track element in a region outside the track keeper; and (b) a flexurally rigid spindle element; wherein the at least one track element encloses the spindle element in a tubular manner and encapsulates the spindle element in a fluid tight manner, wherein the transporting system forms a portion of a production line in semiconductor or solar-cell production, wherein the portion of the production line formed by the transporting system performs wet chemical treatment on blanks, wherein the wet chemical treatment includes etching and cleaning; and transporting the essentially flat articles using the transporting rollers of the transporting system, wherein the essentially flat articles are blanks.

19. A transporting roller for transporting essentially flat articles, the transporting roller having an at least a two part configuration, comprising:

(a) at least one track element, wherein the track element has at least one track keeper, and wherein the track keeper has a diameter that is larger than a diameter of the track element in a region outside the track keeper and the track keeper is made up of at least two disk elements positioned symmetrically in relation to one another and fitted on the track element; and (b) a flexurally rigid spindle element;

wherein the at least one track element encloses the spindle element in a tubular manner.

20. A transporting roller for transporting essentially flat articles, the transporting roller having an at least two part configuration, comprising:

(a) at least one track element, wherein the track element has at least one track keeper, and wherein the track keeper has a first diameter that is larger than a second diameter of the track element in a region outside the track keeper, and the track element has at least two spaced-apart bearing elements fixed on a spindle element of the track element, a third diameter defined by the bearing elements is smaller than the first diameter of the track keeper and larger than the second diameter of the track element in the region outside the bearing elements and the track keeper; and (b) the spindle element, wherein the track element encloses the spindle element in a tubular manner and the spindle element is flexurally rigid.

21. The transporting roller as recited in claim 20, wherein the track element is joinable to a plurality of track elements to form any desired length.

22. The transporting roller as recited in claim 20, wherein the track keeper is conical.

23. The transporting roller as recited in claim 20, wherein the track element can be driven.

24. A transporting roller for transporting essentially flat articles, the transporting roller having an at least two part configuration, comprising:

(a) at least one track element, wherein the track element has at least one track keeper, and wherein the track keeper has a first diameter that is larger than a second diameter of the track element in a region outside the track keeper; and (b) a flexurally rigid spindle element;

wherein the at least one track element encloses the spindle element in a tubular manner, and a fixing ring is located on the spindle element, wherein an internal diameter of the track element, at least at one location, is smaller than a third diameter of the fixing ring.

25. A transporting roller for transporting essentially flat articles, the transporting roller having an at least two-part configuration, comprising:

(a) at least one track element, wherein the track element has at least one track keeper, and wherein the track keeper has a diameter that is larger than a diameter of the track element in a region outside the track keeper; and (b) a flexurally rigid spindle element;

wherein the at least one track element encloses the spindle element in a tubular manner and the track element is retained on the spindle element by a fixing ring made of metal.

26. A transporting roller for transporting essentially flat articles, the transporting roller having an at least two-part configuration, comprising:

(a) at least one track element, wherein the track element has at least one track keeper, and wherein the track keeper has a diameter that is larger than a diameter of the track element in a region outside the track keeper; and (b) a flexurally rigid spindle element;

wherein the at least one track element encloses the spindle element in a tubular manner and the track element has at least one compensation fold in order to accommodate changes in length of the track element.

27. A transporting roller for transporting essentially flat articles, the transporting roller having an at least two part configuration, comprising:

(a) at least one track element, wherein the track element has at least one track keeper, and wherein the track keeper has a diameter that is larger than a diameter of the track element in a region outside the track keeper; and (b) a flexurally rigid spindle element;

wherein the at least one track element encloses the spindle element in a tubular manner, and track keepers of track elements of adjacent transporting rollers rotate, without contact, one in front of the other, one beside the other, or one inside the other.

28. A transporting system for transporting essentially flat articles, having transporting rollers for transporting the essentially flat articles, the transporting rollers each having an at least two part configuration, comprising:

(a) at least one track element, wherein the track element has at least one track keeper, and wherein the track keeper has a diameter that is larger than a diameter of the track element in a region outside the track keeper and the track keeper is made up of at least two disk elements positioned symmetrically in relation to one another and fitted on the track element; and (b) a flexurally rigid spindle element;

wherein the at least one track element encloses the spindle element in a tubular manner.

29. A transporting system for transporting essentially flat articles, having transporting rollers for transporting the essentially flat articles, the transporting rollers each having an at least two-part configuration, comprising:

(a) at least one track element, wherein the track element has at least one track keeper, and wherein the track keeper has a first diameter that is larger than a second diameter of the track element in a region outside the track keeper, and the track element has at least two spaced-apart bearing elements fixed on a spindle element of the track element, a third diameter defined by the bearing elements is smaller than the first diameter of the track keeper and larger than the second diameter of the track element in the region outside the bearing elements and the track keeper; and (b) a flexurally rigid spindle element;

wherein the at least one track element encloses the spindle element in a tubular manner.

30. The transporting system as recited in claim 29, wherein the track element is joinable to a plurality of track elements to form any desired length.

31. The transporting system as recited in claim 29, wherein the track keeper is conical.

32. The transporting system as recited in claim 29, wherein the track element can be driven.

33. A transporting system for transporting essentially flat articles, having transporting rollers for transporting the essentially flat articles, the transporting rollers each having an at least two-part configuration, comprising;

(a) at least one track element, wherein the track element has at least one track keeper, and wherein the track keeper has a first diameter that is larger than a second diameter of the track element in a region outside the track keeper; and (b) a flexurally rigid spindle element;

wherein the at least one track element encloses the spindle element in a tubular manner, and a fixing ring is located on the spindle element, wherein an internal diameter of the track element, at least at one location, is smaller than a third diameter of the fixing ring.

34. A transporting system for transporting essentially flat articles, having transporting rollers for transporting the essentially flat articles, the transporting rollers each having an at least two-part configuration, comprising:

(a) at least one track element, wherein the track element has at least one track keeper, and wherein the track keeper has a diameter that is larger than a diameter of the track element in a region outside the track keeper; and (b) a flexurally rigid spindle element;

wherein the at least one track element encloses the spindle element in a tubular manner, and the track element is retained on the spindle element by a fixing ring made of metal.

35. A transporting system for transporting essentially flat articles, having transporting rollers for transporting the essentially flat articles, the transporting rollers each having an at least two-part configuration, comprising:

(a) at least one track element, wherein the track element has at least one track keeper, and wherein the track keeper has a diameter that is larger than a diameter of the track element in a region outside the track keeper; and (b) a flexurally rigid spindle element;

wherein the track element encloses the spindle element in a tubular manner and the track element has at least one compensation fold in order to accommodate changes in length of the track element.

36. A transporting system for transporting essentially flat articles, having transporting rollers for transporting the essentially flat articles, the transporting rollers each having an at least two-part configuration, comprising:

(a) at least one track element, wherein the track element has at least one track keeper, and wherein the track keeper has a diameter that is larger than a diameter of the track element in a region outside the track keeper; and (b) a flexurally rigid spindle element;

wherein the at least one track element encloses the spindle element in a tubular manner, and track keepers of track elements of adjacent transporting rollers rotate, without contact, one in front of the other, one beside the other, or one inside the other.

37. A transporting system for transporting essentially flat articles, having transporting rollers for transporting the essentially flat articles, the transporting rollers each having an at least two-part configuration, comprising:

(a) at least one track element, wherein the track element has at least one track keeper, and wherein the track keeper has a diameter that is larger than a diameter of the track element in a region outside the track keeper; and (b) a flexurally rigid spindle element;

wherein the at least one track element encloses the spindle element in a tubular manner;

wherein the transporting rollers having track keepers are arranged one after the other such that a width available to the transportable articles, and determined by a spacing between the track keepers, tapers in a transporting direction and articles are thus introducable into transporting tracks, and each track keeper is fitted on each track element at a respective spacing from a next track keeper.

38. A transporting system for transporting essentially flat articles, having at least two transporting rollers for transporting the essentially flat articles, the transporting rollers each having an at least two part configuration, comprising:

(a) at least one track element, wherein the track element has at least one track keeper, and wherein the track keeper has a diameter that is larger than a diameter of the track element in a region outside the track keeper; and (b) a flexurally rigid spindle element; wherein the at least one track element encloses the spindle element in a tubular manner.

39. The transporting system as recited in claim 13, wherein the track element is joinable to a plurality of track elements to form any desired length.

40. The transporting system as recited in claim 13, wherein the track keeper is conical.

41. The transporting system as recited in claim 13, wherein the track element can be driven.

* * * * *